(12) United States Patent
Florent

(10) Patent No.: US 7,854,421 B2
(45) Date of Patent: Dec. 21, 2010

(54) MOUNTING BRACKET AND METHOD OF FABRICATION THEREOF

(75) Inventor: Bertrand Florent, Boucherville (CA)

(73) Assignee: 9209-6627 Quebec Inc., Boucherville, Quebec (CA)

( * ) Notice: Subject to any disclaimer, the term of this patent is extended or adjusted under 35 U.S.C. 154(b) by 0 days.

(21) Appl. No.: 11/085,319

(22) Filed: Mar. 21, 2005

(65) Prior Publication Data
US 2006/0208146 A1    Sep. 21, 2006

(51) Int. Cl.
*A47H 1/10* (2006.01)
(52) U.S. Cl. .................. 248/317; 248/300; 248/301; 52/698
(58) Field of Classification Search .......... 248/339, 248/300, 247, 301, 682, 690, 691, 610, 200, 248/205.1, 220.21, 304, 309.1, 317, 323, 248/325; 52/39, 27, 698, 703, 712
See application file for complete search history.

(56) References Cited

U.S. PATENT DOCUMENTS

| | | | | |
|---|---|---|---|---|
| 3,022,033 A | * | 2/1962 | Flower et al. | 248/300 |
| 3,952,985 A | * | 4/1976 | Davenport | 248/317 |
| 4,787,587 A | * | 11/1988 | Deming | 248/205.1 |
| 4,834,186 A | * | 5/1989 | Ballard | 169/16 |
| 4,978,092 A | * | 12/1990 | Nattel | 248/205.1 |
| 5,423,507 A | * | 6/1995 | Florent et al. | 248/300 |
| 6,668,509 B1 | * | 12/2003 | Krebs | 52/698 |

* cited by examiner

*Primary Examiner*—Terrell Mckinnon
*Assistant Examiner*—Todd M. Epps
(74) *Attorney, Agent, or Firm*—Merchant & Gould P.C.

(57) ABSTRACT

A mounting bracket made in a single sheet of material having lateral faces connected by a joining faces, a region of the joining faces being deformed to comprises an aperture and at least one downward and one upward slot on each side of the aperture, thereby hingedly securing a hook comprising side arms and an open loop.

5 Claims, 11 Drawing Sheets

```
┌─────────────────────────────┐
│  Providing a sheet of metal │──50
└─────────────────────────────┘
              │
              ▼
┌─────────────────────────────┐
│  Deforming the sheet of metal│
│  into a generally U-shaped   │──52
│  element having a pair of    │
│  lateral faces and a joining face │
└─────────────────────────────┘
```

MOUNTING BRACKET AND METHOD OF FABRICATION THEREOF

TITLE OF THE INVENTION

Mounting bracket and method of fabrication thereof

FIELD OF THE INVENTION

The present invention relates to a mounting bracket adapted to be mounted on a ceiling so as to support a weight.

BACKGROUND OF THE INVENTION

Mounting brackets having a generally U-shaped cross-section with lateral faces flaring outwardly so as to generally correspond to the shape of a ceiling, and provided with an opening for hooking a ceiling fixture for example, are known in the art (see for example U.S. Pat. No. 5,423,507 to the present applicant).

Such a bracket may be mounted in a straddling arrangement over a channel formed by two flaring sides of the U-shaped channels of a corrugated ceiling for example, at an angle substantially corresponding to an angle of the flaring lateral faces of the bracket. These lateral faces may be provided with a set of holes adapted to receive screws for securing the lateral faces of the brackets on the sides of the channel. When the bracket is fixed to the channel, a hook having an open loop can be supported and support a ceiling fixture for example. The bracket may also be provided with a pair of openings in the joining face between the two lateral faces, the openings allowing the passage of electrical wires when the ceiling fixture is an electrical fixture.

Such a bracket may also be mounted on a channel of the corrugated ceiling, by straddling the lateral faces thereof over sides of the channel by a set of screws extending through a set of holes provided in the lateral faces of the bracket.

In spite of ongoing developments, there is still a need in the art for mounting brackets having improved strength characteristics while manufactured according to an efficient and cost-effective method.

SUMMARY OF THE INVENTION

More specifically, there is provided a mounting bracket to be fixed under a ceiling, made in a single sheet of material, the sheet of material being deformed into a generally U-shaped cross-section bracket having lateral members and a joining member interconnecting the lateral members; the lateral members flaring outwardly to angularly correspond to side walls of elements of the ceiling and to be applied to these side walls, respectively; the lateral members being provided with means for securing the lateral members to the side walls of the elements of the ceiling; the joining member providing a loop for hooking a fixture to the ceiling.

There is further provided a method for fabricating a mounting bracket to be fixed under a ceiling, comprising the steps of providing a single sheet of metal; and deforming the sheet of metal into a bracket with a generally U-shaped cross-section having a pair of lateral faces and a joining face; whereby the joining face provides a loop for hooking a fixture to the ceiling.

Other objects, advantages and features of the present invention will become more apparent upon reading of the following non-restrictive description of embodiments thereof, given by way of example only with reference to the accompanying drawings.

DESCRIPTION OF EMBODIMENTS OF THE INVENTION

Figure 2:
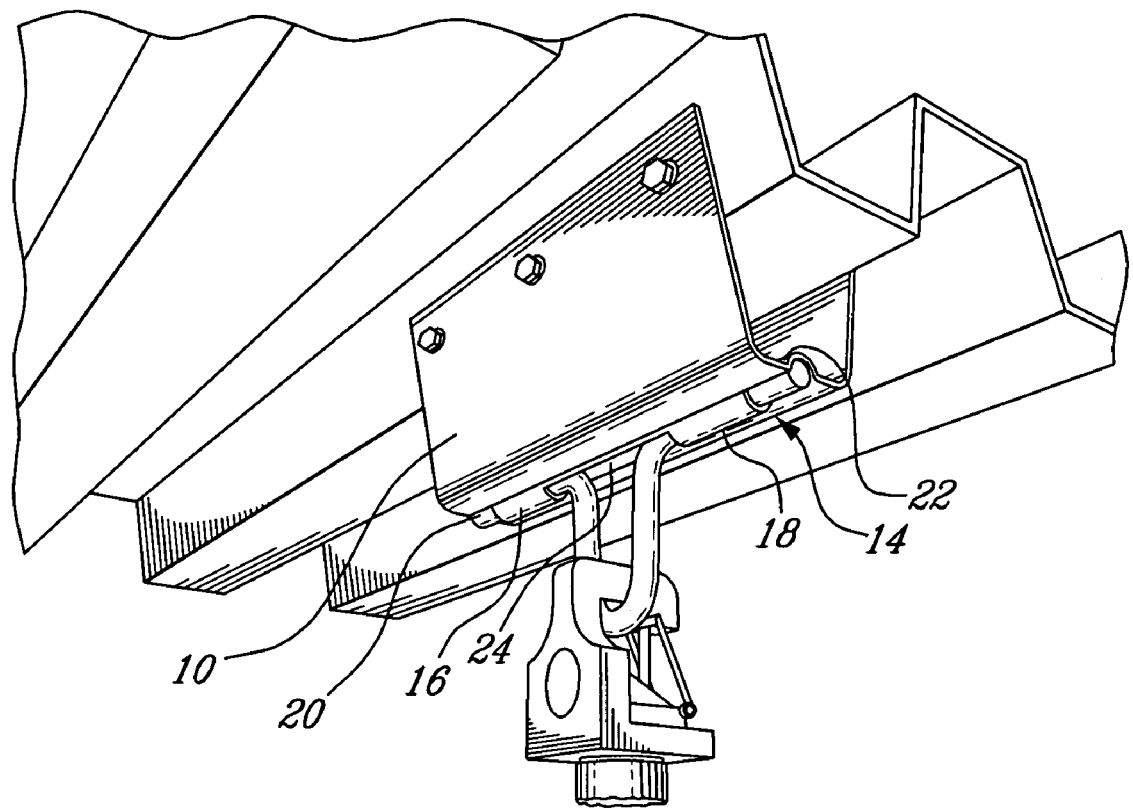
FIG. 2 is a perspective view of the bracket of FIGS. 1.
Figure 4:
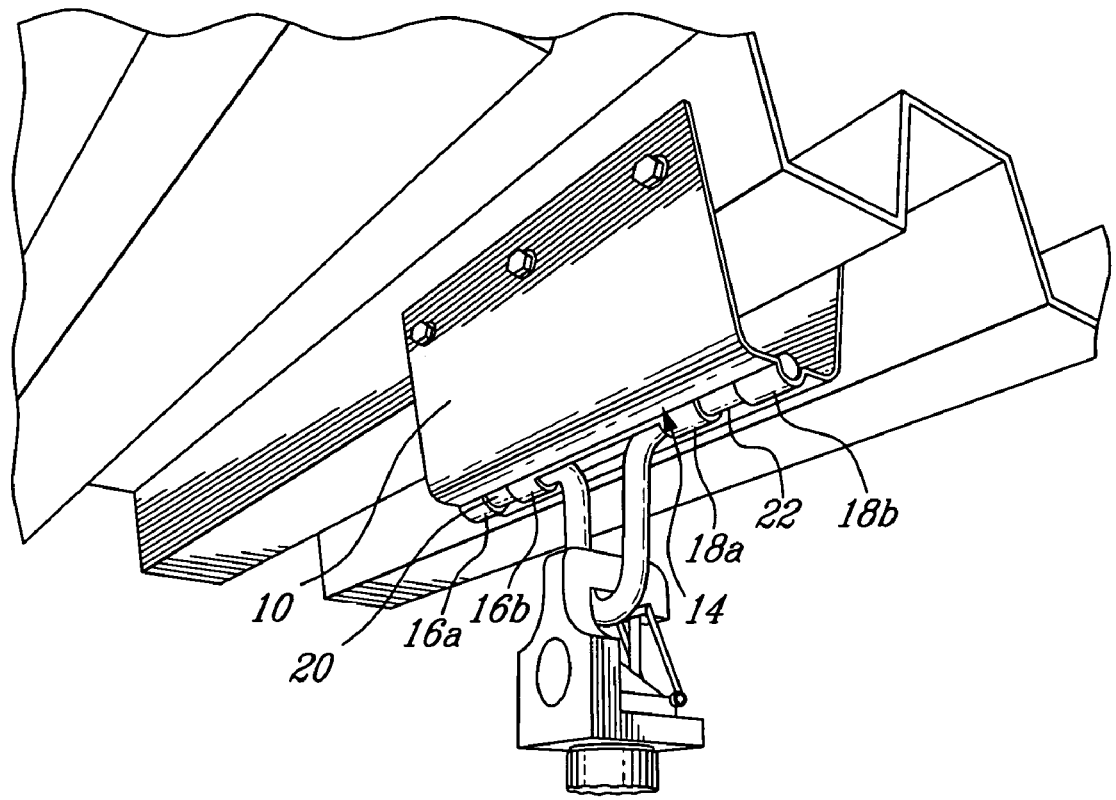
FIG. 4 is a perspective view of the bracket of FIGS. 3.
Figure 6:
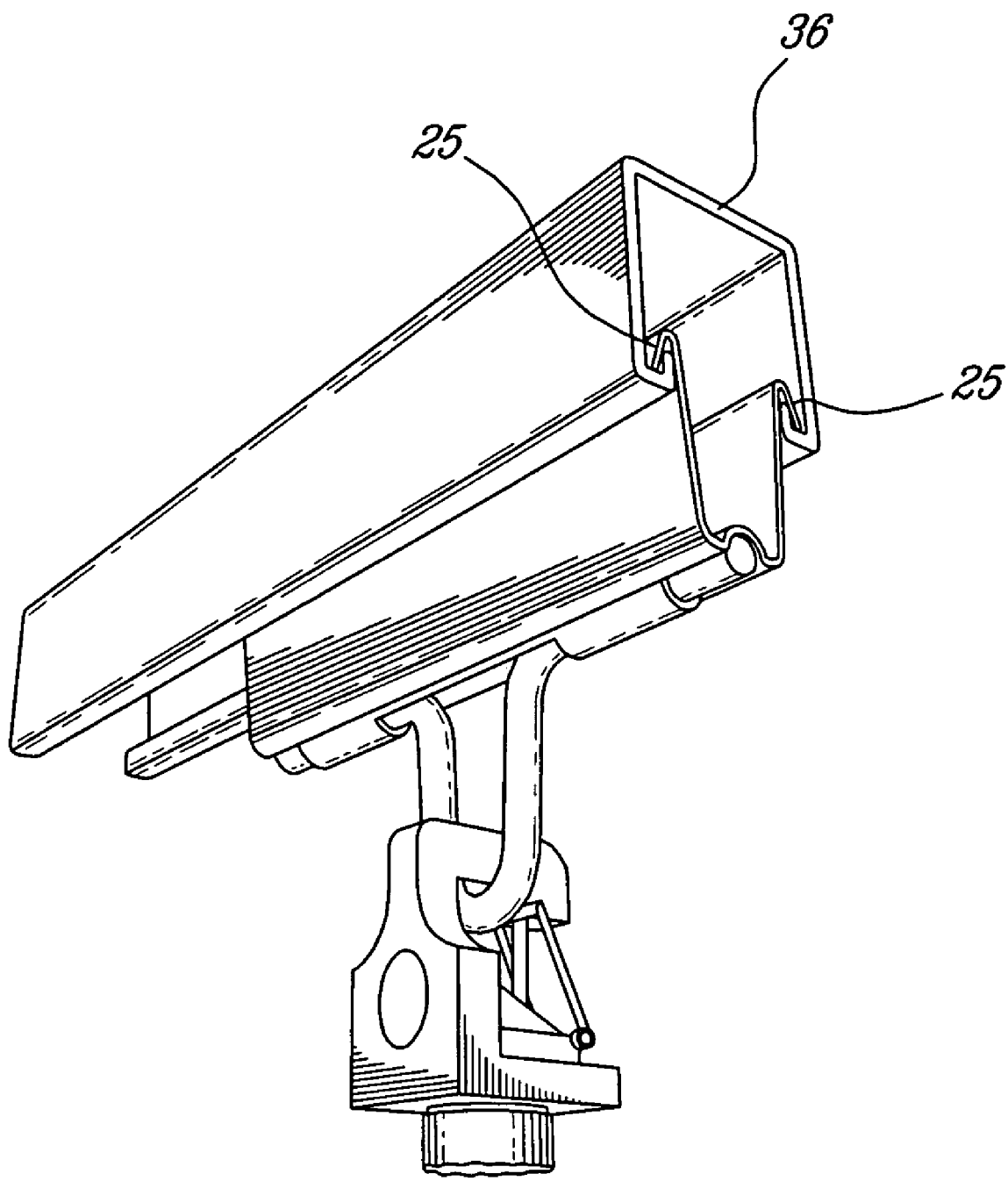
FIG. 6 is a perspective view of the bracket of FIGS. 5.
Figure 7A:
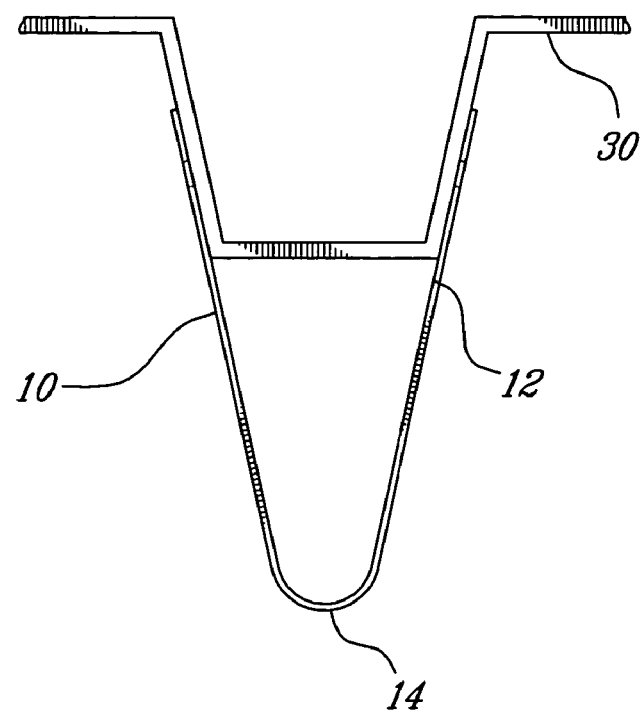
FIG. 7(a) is a transversal cross-section.
Figure 7B:
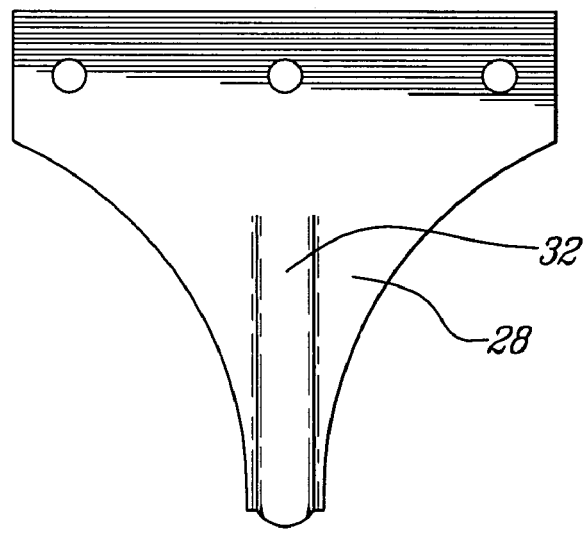
FIG. 7(b) is a longitudinal cross section, of a bracket according to a fourth embodiment of the present invention.
Figure 8:
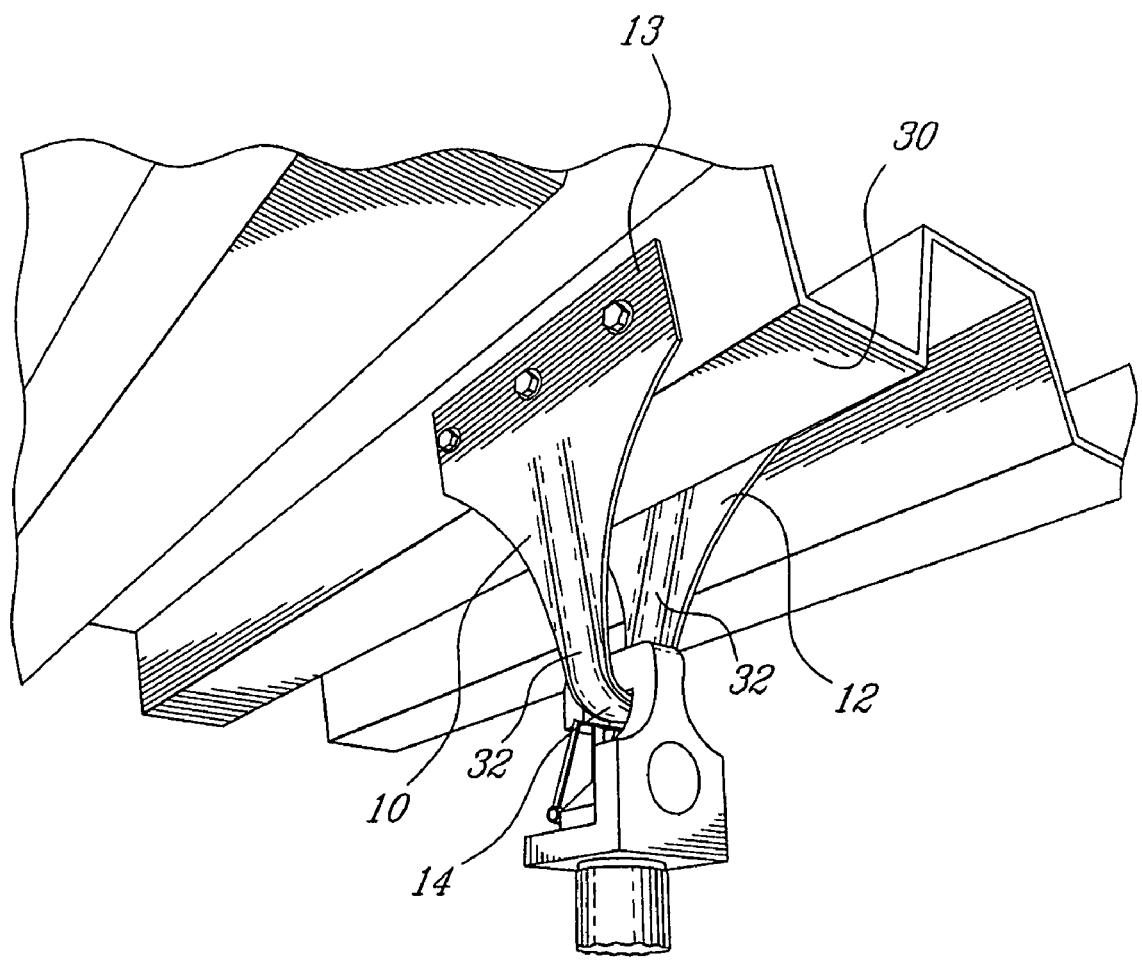
FIG. 8 is a perspective view of the bracket of FIGS. 7.
Figure 9:
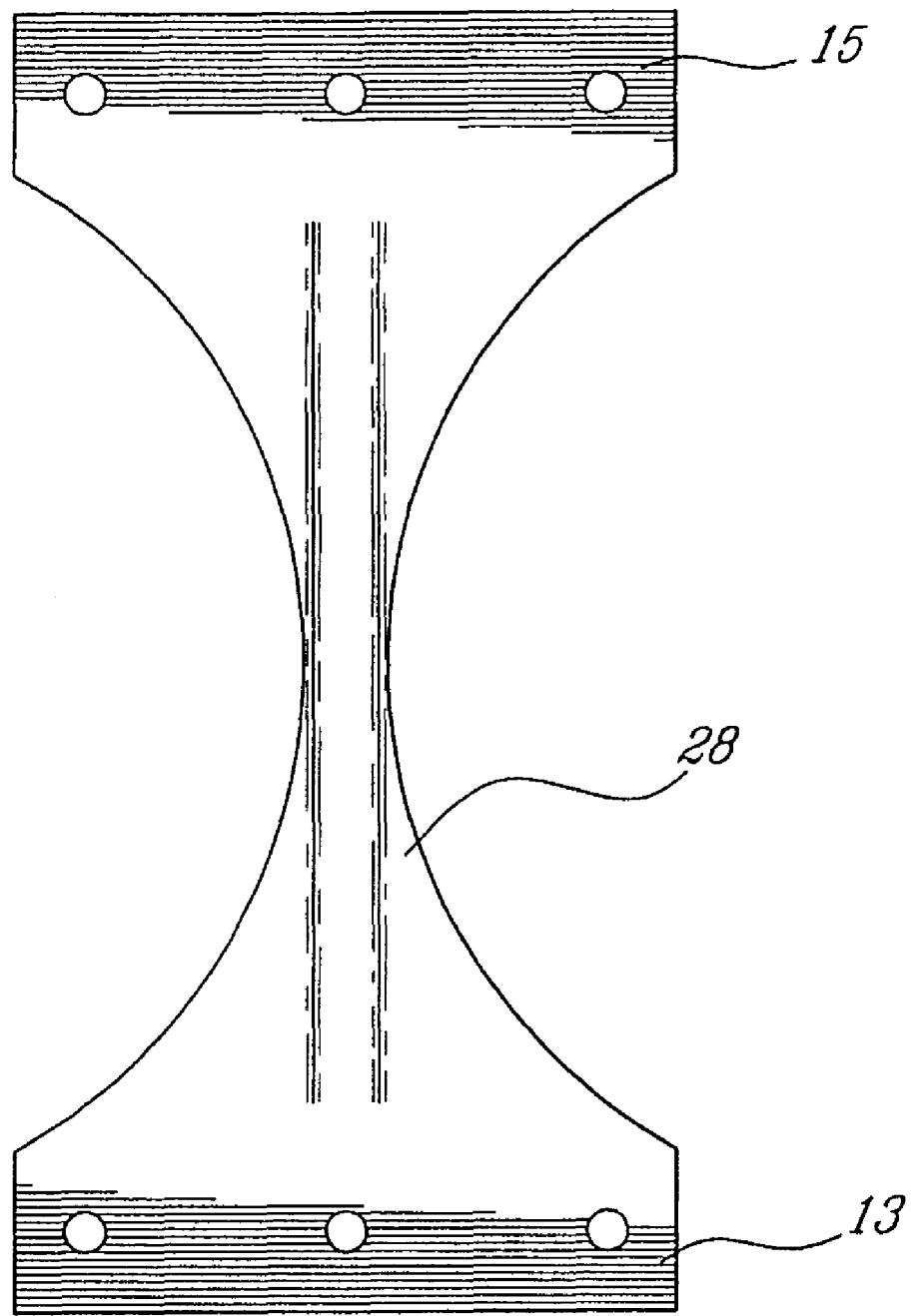
FIG. 9 is a top plan view of the bracket of FIGS. 7.
Figures 11, 12:
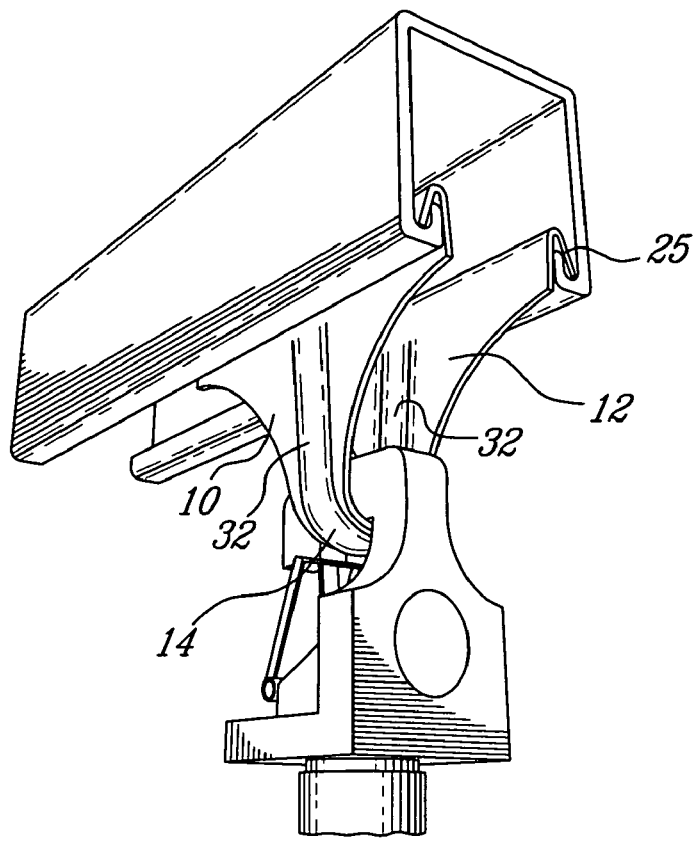
FIG. 11 is a perspective view of the bracket of FIGS. 10.
FIG. 12 is a flowchart of a method according to a second aspect of the present invention.

The brackets are shown in FIGS. 2, 4, 6, 8 and 11 fixed under a ceiling 36. The ceiling may be a corrugated ceiling formed of adjacent U-shaped channels having flaring sides oriented at an angle substantially corresponding to an angle of flaring lateral faces of the brackets described hereinbelow (FIGS. 2, 4, 8). The ceiling may be of a type comprising open beams with lateral walls with a hook-shaped flange (FIGS. 6 and 11).

The bracket is made of a single sheet of metal folded into a generally U-shaped element having a pair of lateral faces 10 and 12 and a joining face 14, wherein the lateral faces 10 and 12 are flaring outwardly from the joining face 14 at a predetermined angle as known in the art.

Figure 1A:
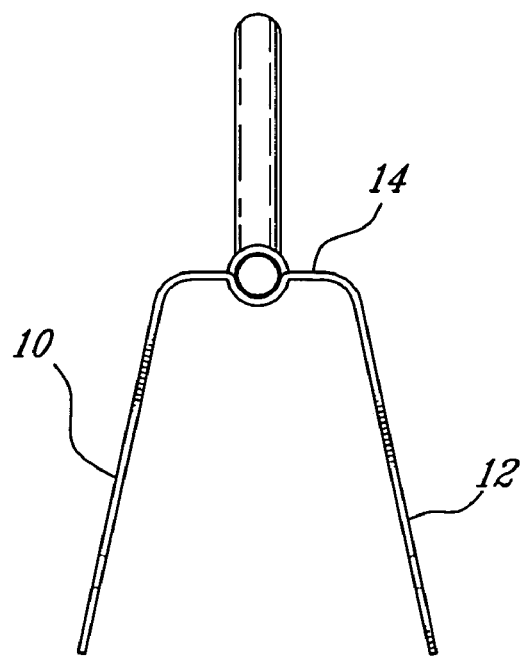
FIG. 1(a) is a transversal cross-section.
Figure 1B:
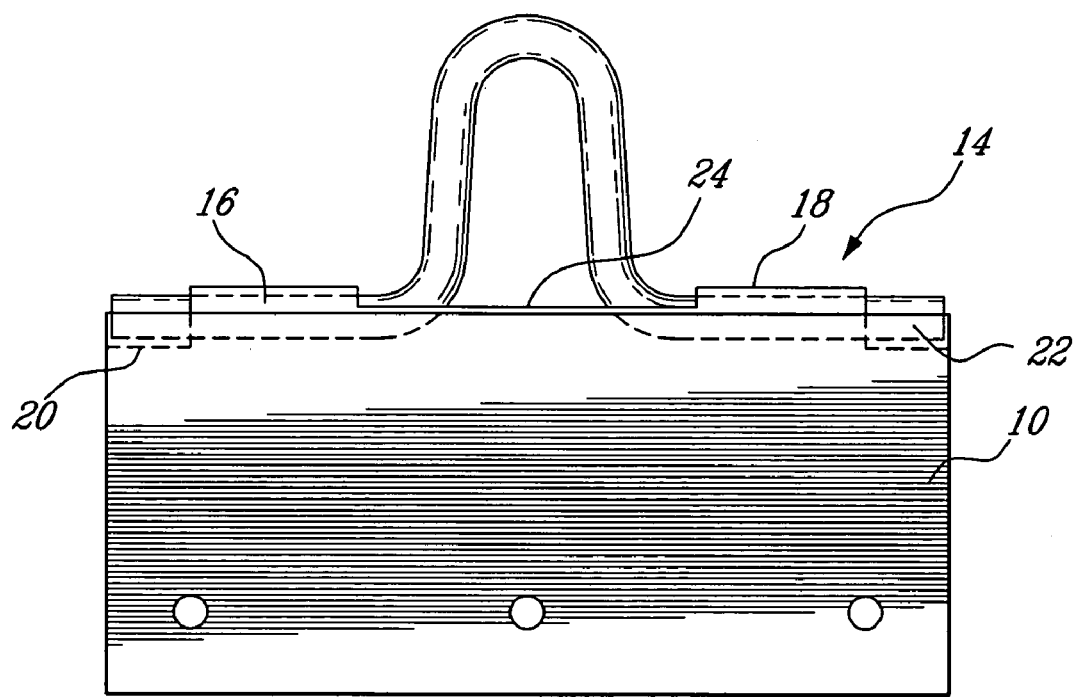
FIG. 1(b) is a longitudinal cross section, of a bracket according to a first embodiment of a first aspect of the present invention.

In the embodiment illustrated in FIGS. 1 and 2, the metal sheet forming the bracket is deformed, in the region of the joining face 14, into a shape comprising two downward slots 16 and 18 on each side of an opening 24, and two upwards slots 20 and 22 each located at each free extremities of the joining face 14.

Figure 3A:
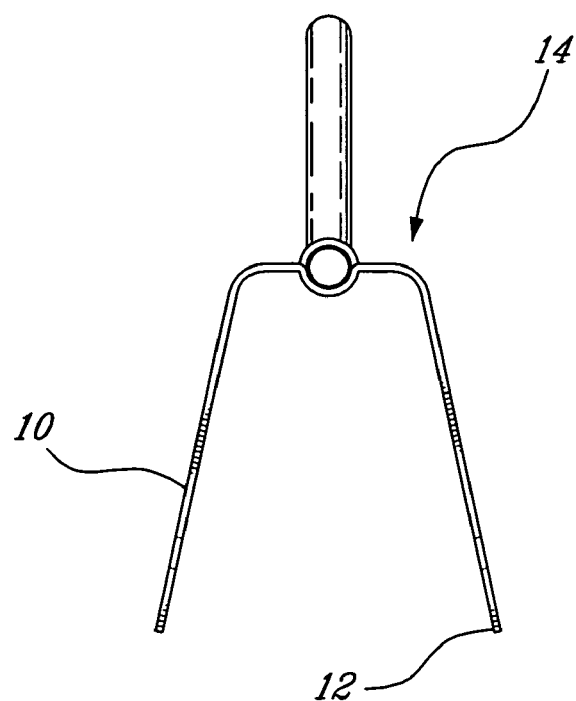
FIG. 3(a) is a transversal cross-section.
Figure 3B:
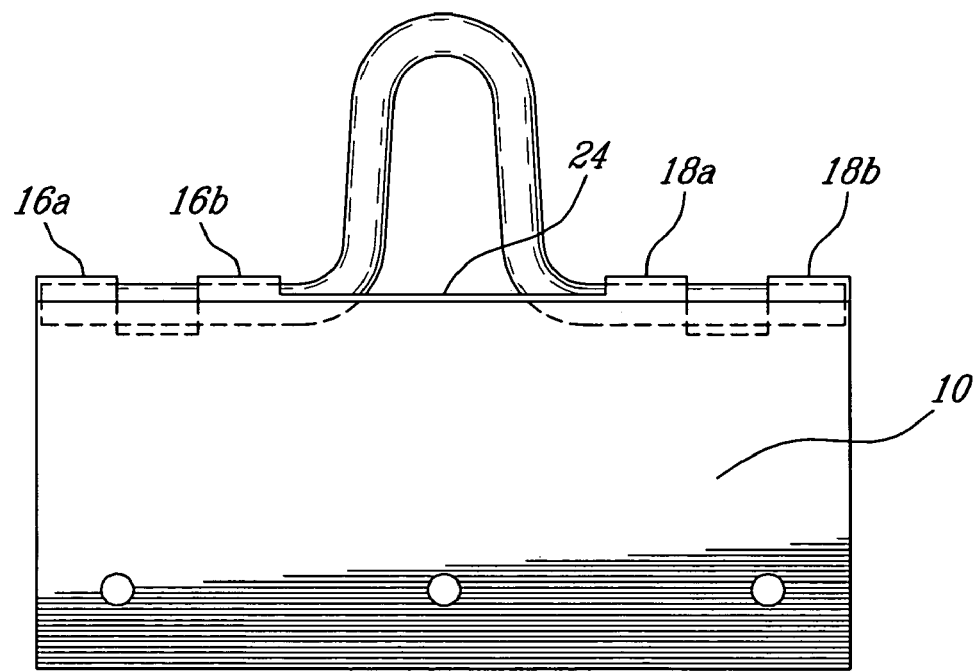
FIG. 3(b) is a longitudinal cross section, of a bracket according to a second embodiment of the present invention.

In the embodiment illustrated in FIGS. 3 and 4, the metal sheet forming the bracket is deformed, in the region of the joining face 14, into a shape comprising four downward slots 18a, 18b, 20a, 20b, i.e. a pair of downward slots on each side of the opening 24, each downward slots of a given pair being in separated by an upwards slots 20, 22.

In either case, the downward and upward slots accommodate generally straight side arms ends of a hook for free rotation in the fashion of a door hinge, while the open loop of the hook extends freely from the opening 24.

In the embodiments of FIGS. 7 to 11, the metal sheet 28 forming the bracket is cut so that, once folded into the bracket, the lateral faces 10 and 12 have a width increasing from a reduced width at the region of the joining face 14 to an enlarged width in a region of attachment 13, 15 with the ceiling element 30. In this alternative, in the region of the joining face 14, the metal sheet is only folded, thereby forming a loop for suspension of a hook. An embossed rib 32 may be provided along a length of the lateral faces 10 and 12 and over the joining face 14 for strengthening the bracket.

The bracket may be rigidified to prevent bending thereof, with lateral flanges extending outwardly relative to free edges of the lateral faces 10 and 12, or extending inwardly relative to the lateral faces 10 and 12.

Figure 5A:
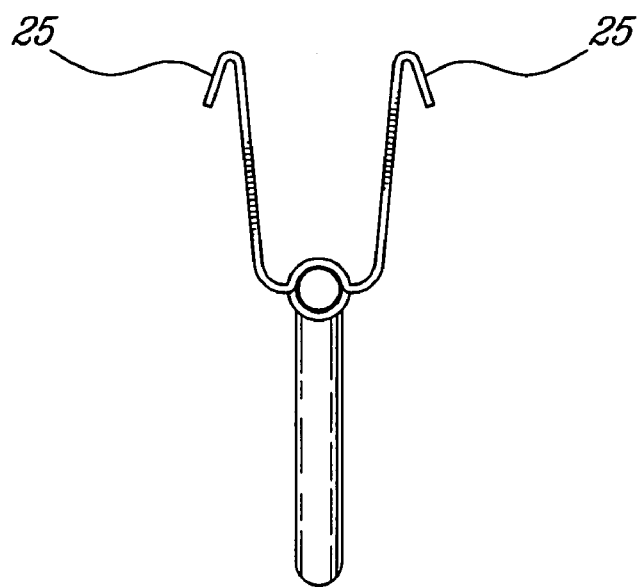
FIG. 5(a) is a transversal cross-section.
Figure 5B:
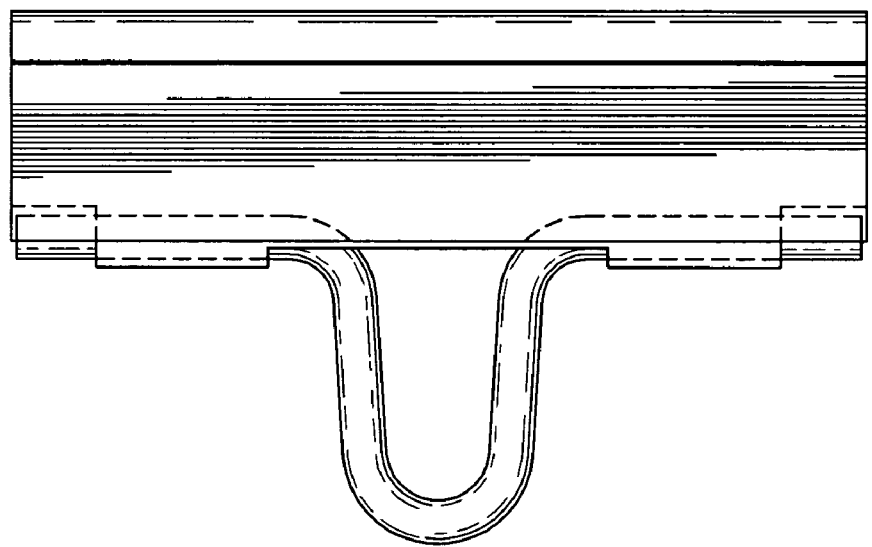
FIG. 5(b) is a longitudinal cross section, of a bracket according to a third embodiment of the present invention.
Figure 10A:
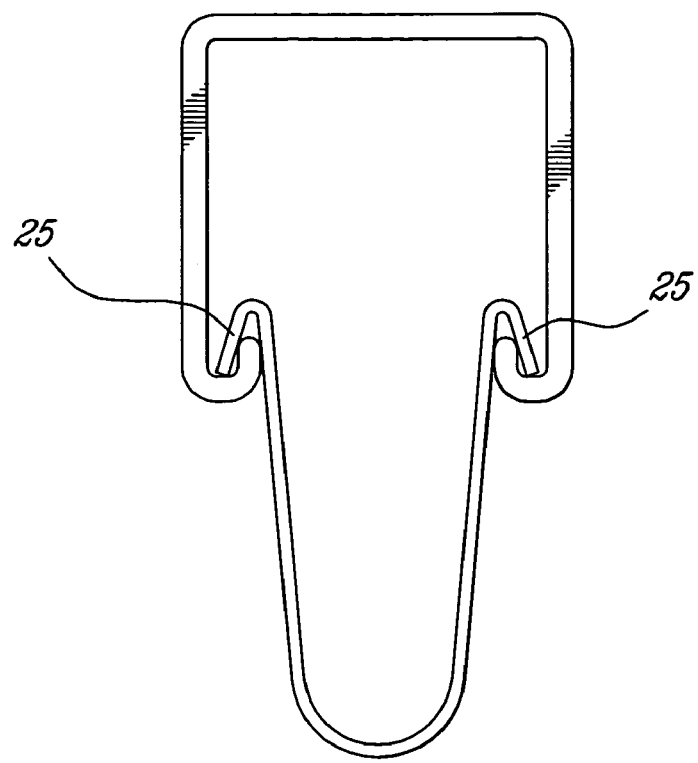
FIG. 10(a) is a transversal cross-section.
Figure 10B:
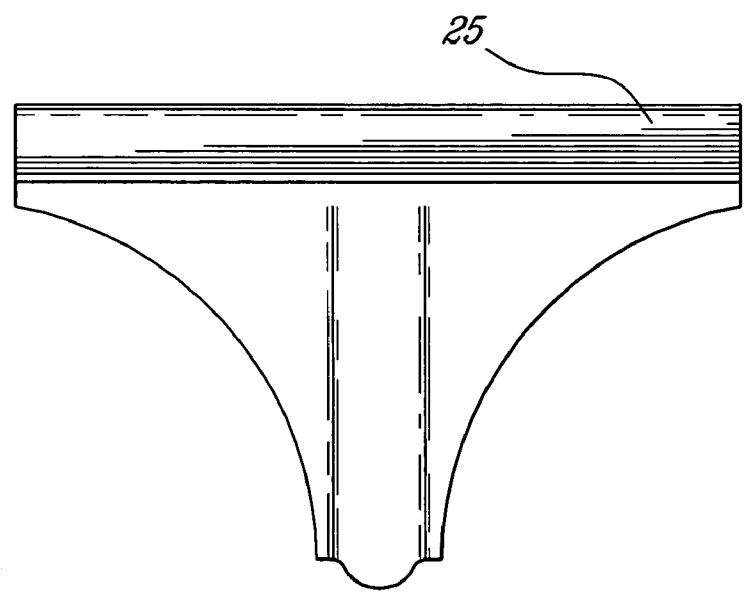
FIG. 10(b) is a longitudinal cross section, of a bracket according to a further embodiment of the present invention.

In FIGS. 5 and 6, as well as in FIGS. 10 and 11, for example, the lateral flanges 25 further allow the bracket to be mounted on a ceiling of the type comprising open beams with lateral walls with a hook-shaped flange mentioned hereinabove.

As illustrated in FIG. 12, a method for fabricating the bracket according to the present invention comprises the steps of providing a single sheet of metal (step 50); and deforming the sheet of metal into a generally U-shaped element having a pair of lateral faces and a joining face (step 52); whereby the joining face allows hanging a hook.

An optional step may comprise deforming extremities of the lateral faces to provide lateral flanges extending outwardly relative to free edges of the lateral faces, or extending inwardly relative to the lateral faces.

In step 50, the metal sheet may have constant width (see FIGS. 1-6) or be cut to have a decreasing width from a first attachment region to a mid height region, and then a symmetrically increasing width from the mid height region to a second attachment region.

In step 52, the sheet of metal is folded so as to yield a generally U-shaped bracket with lateral faces flaring outwardly from a joining face at a predetermined angle as known in the art, providing a loop for hooking a ceiling fixture for example.

Depending of the width of the sheet of metal in the region of the joining face, the method may further comprise deforming the region of the joining face to provide an opening having alternating upwards and downwards slots on each side (see FIGS. 1-6), the opening hingedly securing a rod having an open loop and side arms, the open loop forming a hook protruding out from the opening away from the ceiling, for suspension of a ceiling fixture for example.

The bracket of the present invention, made in a single sheet of metal, may withstand a weight of 100 pounds and up to 1000 pounds hanging from the hook. Moreover, the provision of a hinge type of suspension in the region of the joining face makes it resistant to vibration.

People in the art will appreciate that the present invention further allows a simplified and efficient method for fabricating brackets, yielding light and strong brackets, by avoiding steps such as welding for example.

Although the present invention has been described hereinabove by way of embodiments thereof, it may be modified, without departing from the nature and teachings of the subject invention as defined in the appended claims.

What is claimed is:

1. A mounting bracket to be fixed under a ceiling, said mounting bracket being made in a single sheet of material having widened end portions and a center portion of reduced width, said single sheet of material being deformed in a generally U-shaped cross-section bracket having opposite straight lateral faces flaring outwardly from opposite edges of a central joining face, the lateral faces forming respective attachment regions configured to be mounted to substantially vertical faces of elements of the ceiling, wherein said center portion of reduced width forms the central joining face joining the lateral faces together when the sheet of material is folded so that the lateral faces flare in opposite outward directions to form a lower suspension loop, the single sheet of material forming a reinforcing rib extending along a portion of a first one of the lateral faces, across the central joining face and along a portion of a second one of the lateral faces.

2. The mounting bracket according to claim 1, said attachment region of at least one of said lateral faces comprising a lateral flange at a free edge thereof.

3. A mounting bracket according to claim 1, wherein the reinforcing rib comprises a raised rib extending downward from the central joining face and laterally outward from the lateral faces.

4. A mounting bracket according to claim 1, wherein the reinforcing rib extends along the lateral faces in a vertical orientation.

5. A bracket fixed under a ceiling for supporting a suspended weight hanging therefrom, said bracket being made in a single sheet of material having widened end portions and a center portion of reduced width, said single sheet of material being folded about a longitudinal direction at the center portion thereof to provide opposite straight lateral faces flaring outwardly from each side of the center portion, the lateral faces forming respective attachment regions configured to be mounted to substantially vertical faces of elements of the ceiling and flaring in opposite outward directions from the center portion to form a lower suspension loop; a reinforcing rib extending perpendicularly to the longitudinal direction and over the center portion and at least part of the lateral faces.

* * * * *